(12) United States Patent
Scriber

(10) Patent No.: US 12,174,993 B1
(45) Date of Patent: Dec. 24, 2024

(54) SYSTEMS AND METHODS FOR ADVANCED PRIVACY PROTECTION OF PERSONAL INFORMATION

(71) Applicant: CABLE TELEVISION LABORATORIES, INC., Louisville, CO (US)

(72) Inventor: Brian A. Scriber, Lafayette, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 438 days.

(21) Appl. No.: 17/396,257

(22) Filed: Aug. 6, 2021

Related U.S. Application Data

(60) Provisional application No. 63/045,933, filed on Jun. 30, 2020.

(51) Int. Cl.
  *G06F 21/62* (2013.01)
  *G06F 16/22* (2019.01)
  *G06F 16/245* (2019.01)

(52) U.S. Cl.
  CPC ...... *G06F 21/6245* (2013.01); *G06F 16/2282* (2019.01); *G06F 16/245* (2019.01); *G06F 21/6227* (2013.01)

(58) Field of Classification Search
  CPC ............ G06F 21/6245; G06F 21/6227; G06F 21/604; G06F 2221/00; G06F 16/2455; G06F 16/245; G06F 16/252; H04W 12/02
  See application file for complete search history.

(56) References Cited

U.S. PATENT DOCUMENTS

| | | | |
|---|---|---|---|
| 6,581,059 B1 * | 6/2003 | Barrett | G06F 21/6245 707/999.009 |
| 7,748,026 B1 * | 6/2010 | Lee | H04L 63/20 726/28 |
| 8,978,159 B1 * | 3/2015 | van Dijk | G06F 21/6227 726/29 |

(Continued)

FOREIGN PATENT DOCUMENTS

WO  WO-2017194214 A1 * 11/2017 ......... G06F 21/6254

OTHER PUBLICATIONS

Laravel. "Eloquent: Getting Started—Laravel—The PHP Framework for Web Artisans", https://web.archive.org/web/20200502011605/https://laravel.com/docs/7.x/eloquent#soft-deleting, retrieved Mar. 21, 2024. Archive date May 2020. (Year: 2020).*

(Continued)

*Primary Examiner* — Michael Simitoski
(74) *Attorney, Agent, or Firm* — Armstrong Teasdale LLP

(57) ABSTRACT

A server device is provided for protecting personal information. The server device includes a transceiver configured for operable communication with at least one client over a communication network, and a processor including a memory configured to store computer-executable instructions. When executed by the processor, the instructions cause the server device to store a database including one or more fields of personally identifiable information (PII), generate a query for the database to request access a first field of the one or more fields of PII, wherein the query includes a use for the requested field of PII, query the database to determine if the use for the requested field of PII is valid, and when the use for the request field of PII is valid, provide access to the requested field of PII data.

19 Claims, 3 Drawing Sheets

(56) References Cited

U.S. PATENT DOCUMENTS

| | | | | |
|---|---|---|---|---|
| 10,404,757 | B1* | 9/2019 | Horton | H04L 67/02 |
| 10,909,176 | B1* | 2/2021 | Naeymi-Rad | G06F 40/157 |
| 11,748,713 | B1* | 9/2023 | Tran | G10L 15/08 |
| | | | | 705/7.18 |
| 2004/0078236 | A1* | 4/2004 | Stoodley | G16H 70/20 |
| | | | | 705/2 |
| 2006/0074938 | A1* | 4/2006 | Miller | G06F 30/327 |
| 2011/0119732 | A1* | 5/2011 | Dunn | H04L 63/102 |
| | | | | 726/1 |
| 2014/0075571 | A1* | 3/2014 | Jackson | G06F 16/211 |
| | | | | 726/28 |
| 2014/0380404 | A1* | 12/2014 | Raj | G06F 21/6218 |
| | | | | 726/1 |
| 2016/0112208 | A1* | 4/2016 | Williams | H04L 9/3268 |
| | | | | 713/176 |
| 2019/0109706 | A1* | 4/2019 | Peterson | H04L 9/0825 |
| 2019/0163928 | A1* | 5/2019 | Hankeln | G06F 16/11 |
| 2019/0235923 | A1* | 8/2019 | Collins | G06F 9/5011 |
| 2019/0294817 | A1* | 9/2019 | Hennebert | H04L 9/0861 |
| 2020/0169421 | A1* | 5/2020 | Farkash | H04L 63/062 |
| 2021/0096957 | A1* | 4/2021 | Rahman | G06F 11/1471 |
| 2021/0117568 | A1* | 4/2021 | Liu | G06F 21/6245 |
| 2021/0329037 | A1* | 10/2021 | O'Byrne | H04L 63/102 |
| 2022/0173913 | A1* | 6/2022 | Lloyd | H04L 9/0841 |
| 2022/0239681 | A1* | 7/2022 | Newman | G06F 11/3006 |
| 2023/0032863 | A1* | 2/2023 | Bolser | G06F 21/6245 |
| 2023/0143593 | A1* | 5/2023 | Fuchs | G16H 30/40 |
| | | | | 726/27 |
| 2023/0188358 | A1* | 6/2023 | Wang | H04L 9/3247 |
| | | | | 713/176 |

OTHER PUBLICATIONS

Friedel, M. "Deleting data: soft, hard or audit?", https://www.martyfriedel.com/blog/deleting-data-soft-hard-or-audit, retrieved Mar. 21, 2024. Jul. 2020. (Year: 2020).*

* cited by examiner

SYSTEMS AND METHODS FOR ADVANCED PRIVACY PROTECTION OF PERSONAL INFORMATION

CROSS REFERENCE TO RELATED APPLICATIONS

This application claims the benefit of and priority to U.S. Provisional Application No. 63/045,933, filed Jun. 30, 2020, entitled "OPTING-IN: DESIGNING PRIVACY TRACKING FOR CONSUMER CONFIDENTIALITY & CRYPTOGRAPHIC ASSURANCE FOR ENTERPRISES," which is hereby incorporated by reference in its entirety.

BACKGROUND

The field of the invention relates generally to protecting personal information, and more specifically, to systems and methods for managing the privacy of personal information.

Several jurisdictions have passed, or are drafting, legislation to protect an individual's personal information. Examples include, in the United States, the Children's Online Privacy Protection Act (COPPA), the Health Insurance Portability and Accountability Act, and the California Consumer Privacy Action (CCPA), in Canada, the Personal Information Protection and Electronic Documents Act (PIPEDA), and in the European Union, the General Data Protection Regulation (GDPR). These various acts include a collection of features, including, but not limited to, opt-in and opt-out, right to be forgotten, explicit consent requirements, and potentially severe penalties. The requirements can be conflicting, where one requires data to be deleted, while another might also require proof of deletion. These various requirements make it difficult for developers to properly protect data for both new and existing applications. For example, how to prove to a regulator that a piece of information is no longer available and has been properly removed. Accordingly, improved systems that can support multiple different features of personal information protection would be advantageous.

SUMMARY

In an embodiment, a server device is provided for protecting personal information. The server device includes a transceiver configured for operable communication with at least one client over a communication network. The server device also includes a processor including a memory configured to store computer-executable instructions. When executed by the processor, the instructions cause the server device to store a database including one or more fields of personally identifiable information (PII). When executed by the processor, the instructions also cause the server device to generate a query for the database to request access a first field of the one or more fields of PII. The query includes a use for the requested field of PII. When executed by the processor, the instructions further cause the server device to query the database to determine if the use for the requested field of PII is valid. In addition, when the use for the request field of PII is valid, the instructions cause the server device to provide access to the requested field of PII data

BRIEF DESCRIPTION

These and other features, aspects, and advantages of the present disclosure will become better understood when the following detailed description is read with reference to the following accompanying drawings, in which like characters represent like parts throughout the drawings.

Figure 1:
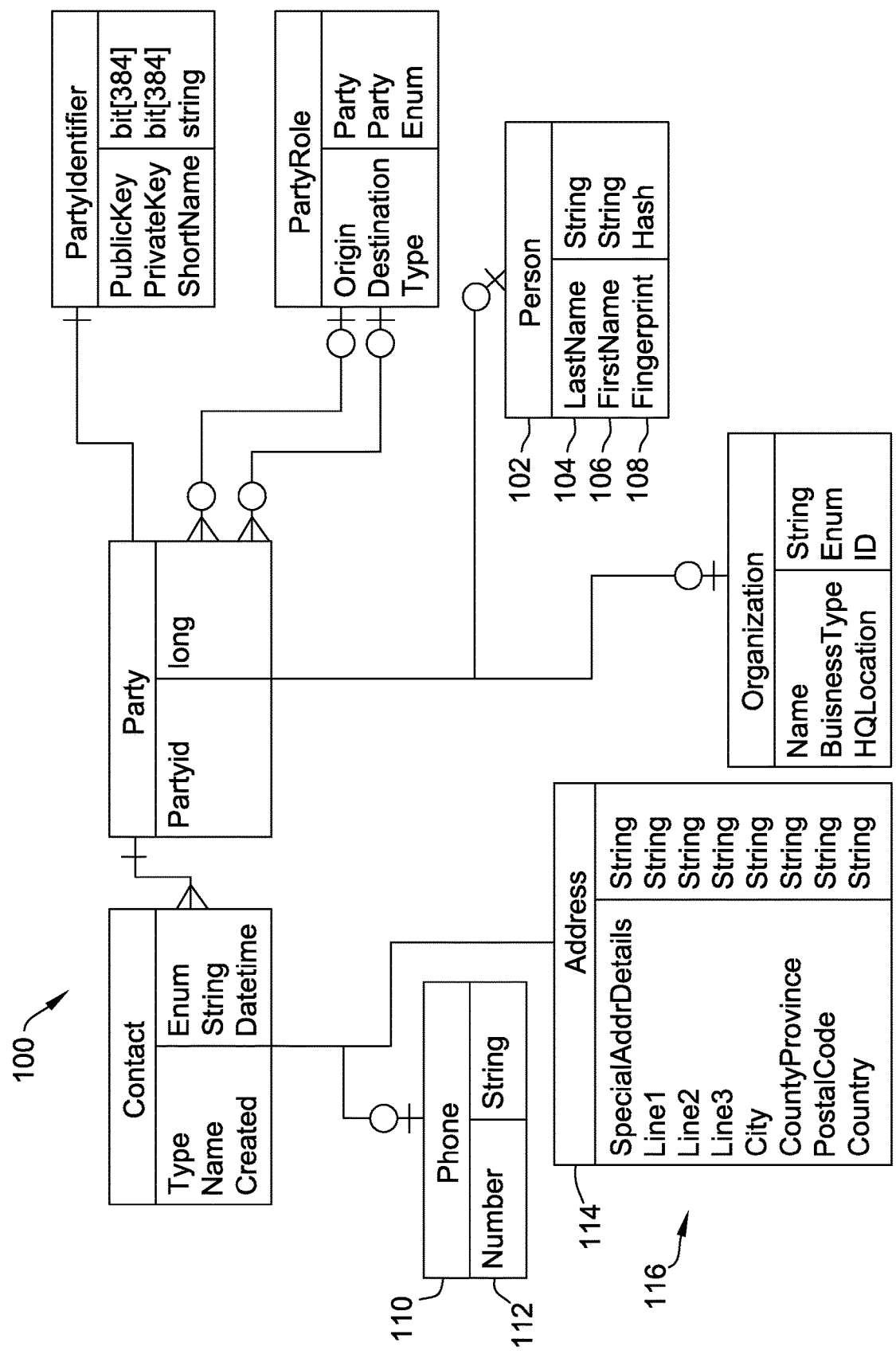
FIG. 1 illustrates an entity relationship data model of a database for storing information in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments relate generally to protecting personal information, and more specifically, to systems and methods for managing the privacy of personal information. For ease of explanation, the following description may generically refer to these several innovative embodiments as "privacy protecting personal data" (PPPD) The privacy protecting personal data system herein enables the developer or database administrator to manage personal data to comply with the laws of multiple different jurisdictions. Furthermore, the systems and methods described herein provide multiple implementations that can be used based on the design of current and future database systems.

The privacy protecting personal data system provides a first methodology that uses existing string fields to add in data to be used for managing associated personal information. The second methodology uses the existing string fields to direct the system to additional tables where the data for managing the associated personal information is stored. The third methodology creates an extended data model for storing and managing sensitive data.

The privacy protecting personal data systems described herein can work in concert with other privacy system, such as, the "SYSTEMS AND METHODS FOR PRIVACY MANAGEMENT USING A DIGITAL LEDGER," described in U.S. patent application Ser. No. 16/264,406, filed Jan. 31, 2019, which is incorporated by reference here.

FIG. 1 illustrates an entity relationship data model of a database 100 for storing information in accordance with at least one embodiment. In the exemplary embodiment, the database 100 is a relational database. Database 100 stores a plurality of information that may be considered personally identifiable information (PII), for example, but not limited to, date of birth, birth location, name, address, age, ethnicity, citizenship, credit card details, and medical records. Database 100 could be, but is not limited to, a business database (such as one for employee information), a medical database (such as one for a medical practice), a sales database (such as for an online e-commerce vendor), a marketing database (such as for use in providing advertising to individuals in the database), and a subscriber database (such as for a cable provider, a streaming service). Ones having skill in the art would understand that database 100 and the modifications described in FIGS. 2-4 could be used in any database that requires the protection of private data, such as PII.

In FIG. 1, a Person Table 102 includes a plurality of fields, including, but not limited to, a lastname field 104, a firstname field 106, and a fingerprint field 108. Lastname field 104 and first name field 106 are both strings. In some embodiments, strings are limited to 55 characters. In other embodiments, strings can be extensible or extended by the user. However, memory problems may arise when the length of all of the strings or a portion of the strings in the database 100 are extended. The fingerprint field 108 includes a hash of the person's fingerprint. In some embodiments, the fingerprint field 108 is dropped or has additional protection (i.e., encryption) since a fingerprint cannot be change while a password can. Database 100 also includes a Phone Table 100, which includes a number field 112, which is a string. Address Table 114 includes a plurality of fields 116, where each field is a string.

In some embodiments, the strings can be replaced or updated with binary large objects (BLOB) if the use cases and/or embodiments require additional space that the strings cannot provide.

Traditional Database Design (DD) for Relational Database Systems (RDBS) involves organizing data to reduce redundancy and reduce update/deletion/insertion problems. This activity is called normalization and industry norms use terms like First Normal Form, Second Normal Form, Third Normal Form, and Boyce-Codd Normal Form to describe the data structures that allow for relationships between data. The problem with this normalization, is that it worked for data where there are fewer concerns about the meta-data related to that data. With the various privacy-protecting regulations (GDPR, PIPEDA, CCPA, CCRA, etc.), there is now a need for additional tooling to manage the data models. Meta-data includes where the data came from, when it was added, for what it is allowed to be used for, when use needs to stop for different use-cases or users or applications, if the data has sensitivity or requires special protection/encryption, if explicit or implied consent is required for specific uses, if the permissions granted have been revoked, and if the data itself needs to be deleted.

Figure 2:
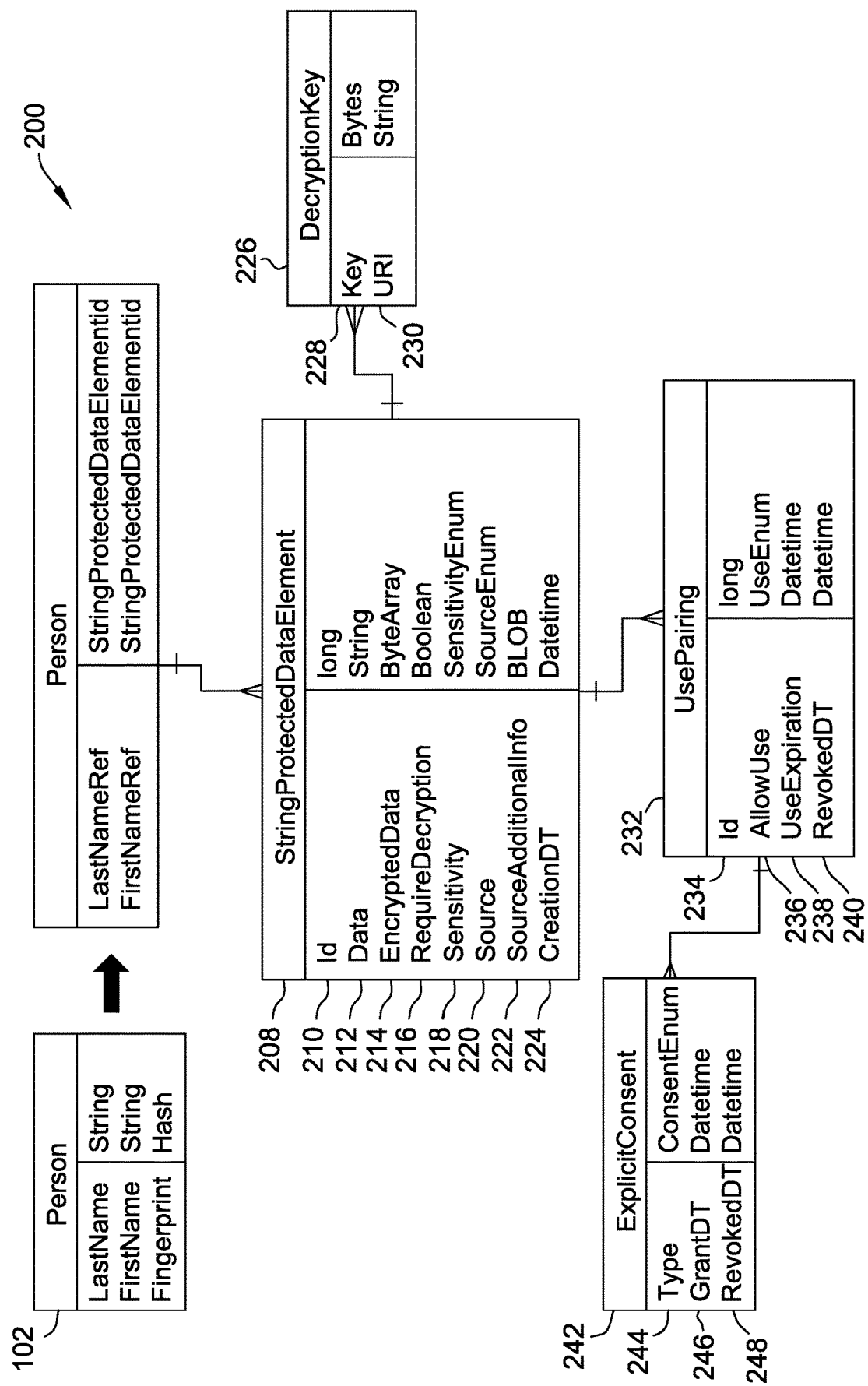
FIG. 2 illustrates a diagram of an extended data model for storing sensitive data with the database shown in FIG. 1.

FIG. 2 illustrates a diagram of an extended data model 200 for storing sensitive data with the database 100 (shown in FIG. 1). FIG. 1 shows the traditional view of DD with a breakdown of how information would be stored about a person and their peripheral data. FIG. 2 illustrates a Sensitive Data Extension to this extended data model 200 that focuses on an example segment of that database 100: the three Person Table 102 attributes (or fields) of LastName 104, FirstName 106, and Fingerprint 108. In FIG. 2, the Fingerprint field 108 has been removed to limit the data to LastName 102 and FirstName 104. Other information like Address 110 and Phone Number 114 can be also enhanced with their own sensitive data extensions. In some embodiments, the Fingerprint field 108 can be stored separately to further protect it in case of a risk of breach. While passwords can be reset, it's impossible to get a new set of fingerprints issued for users.

The other two attributes (fields) (LastName 104 and FirstName 106) are shown in Person Table 202 (as LastNameRef 204 and FirstNameRef 206) as references to StringProtectedDataElement table 208. In the StringProtectedDataElement table 208 there are several attributes, ID 210 (for the reference out of the Person Table), Data 212, storing the actual String Data (this can be a String or VarChar type, or a BLOB, if the size isn't known), EncryptedData 214 (a BLOB of bytes or as a ByteArray if the maximum length is known) which is used to store the data if there are restrictions on view access to this field, RequireDecryption 216 is a Boolean value (True for requires decryption, False otherwise), Sensitivity 218-which is an enumerated value of who can view the data (to be defined by the implementation team with appropriate values for the application(s), an example set of enumerated values might be {NOT_SENSITIVE, CONFIDENTIAL, SENSITIVE, SECRET, TOP_SECRET, EYES_ONLY}), Source 220—which is also an enumerated value that describes how the data was collected (to be defined by the implementation team with appropriate values for the application(s), an example set of enumerated values be might {MARKETING_CAMPAIGN_NUMBER_721, MARKETING_CAMPAING_NUMBER_44, USER_SUPPLIED, REGISTRATION, PURCHASED, AFFILIATE_NUMBER_551, AFFILIATE_NUMBER_23}), SourceAdditionalInfo 220 is a BLOB (which may be the scan of the input data, the registration information, warranty card, marketing recording, video file-any source info used for this field), and the CreationDT 224 which is a Datetime showing when this field was created or when data behind the StringProtectedDataElement 208 was collected or created. The StringProtectedDataElement 208 can have relationships (one-to-one, zero-to-many, or one-to-many) with DecryptionKey 226 and (zero-to-many) with UsePairing 232. In the DecryptionKey table 226 a Key 228 (actual cryptographic key to be used to decrypt) and a Uniform Resource Identifier (URI) 230 (in case the keys are stored elsewhere or require additional access hurdles to be cleared first) are stored.

In some embodiments, there is an option for an Id field (not shown in diagram) which would refer back to the StringProtectedDataElement table 208 in a zero-to-many or one-to-many relationship or the StringProtectedDataElement 208 would store the ID of the DecryptedKey 226 in a one-to-one relationship.

The UsePairing table 232 shows how the data in the StringProtectedDataElement 208 (the user's FirstName, for example) is allowed to be used. For example, a LastName 104 could be used as a part of an external marketing campaign, while the FirstName 106 is reserved for use only in internal marketing campaigns. The attributes of this table are the Id 234 for the StringProtectedDataElement 208 referring to this UsePairing 232, AllowedUse 236 which is enumeration of allowed uses (to be defined by the implementation team with appropriate values for the be application(s), an example set of enumerated values might {MARKETING_EXPLICIT, MARKETING_IMPLICIT, RECALL, WARRANTY, UPDATES AVAILABLE, SWEEPSTAKES_EXPLICIT, SWEEPSTAKES_IMPLICIT}), UseExpiration 238 which is the Datetime for when this particular use of the information (aka FirstName 106) can no longer be used, and the RevokedDT 240 which is the Datetime for when this particular use was revoked (typically ahead of the previously scheduled UseExpiration 238). For example, an employee may leave a company, which would be used as a revocation for all internal marketing. In another example, an individual may invoke their right to be forgotten effectively revoking them from all or most UsePairings 232. In the exemplary embodiment, the extended data model 200 can store a different UsePairing table 232 for each potential use of the FirstName 106 and LastName 108.

The UsePairing table 232 has a zero-to-many relationship with the ExplicitConsent table 242, one row of that table for each AllowedUse 236 that requires explicit consent from the user. The ExplicitConsent table 242 has five or more potential attributes, ID (not shown in diagram) for the UsePairing table 232 referencing it, ConsentBLOB (not shown in diagram) for storing the scan or recording of the user granting consent for use, Type 244 storing the type of consent, such as email, marketing sign-up, or any other type defined as needed, the GrantDT 246 storing the Datetime for when permission was granted, and the RevokedDT 248 (which may be empty/NULL) for when any revocation of permission was obtained. Another optional value in a table like this may be the RevokationBLOB (not shown) to store the recording, video, scan, or email of the user revocation.

In some embodiments, the UsePairing table 232 is used to limit searches and/or queries to not retrieve PII if not available. In these embodiments, the searches and/or queries includes a request for a piece of information and their planned use. For example, the planned use could be for WARRANTY information, such as a warranty update or a recall etc. The system scans the database 100 including the extended data model 200 for individual LastNames 104 where the user has allowed the use for WARRANTY purposes and that has not expired or been revoked. While this does complicate the queries, this system limits unauthorized use of PII. It allows the system administrator or other user to document how information is deleted and show this to any auditor.

In some situations, the question becomes whether or not PII information should be erased or otherwise overwritten. However, an issue arises with the need for audits in one or more of the regulations. If all of an individual's information is deleted, how can the database administrator prove to an auditor that the information is no longer available to the system. This can be approached in multiple ways. First, the system could delete the information from the database 100 and/or the extended data model 200. In these embodiments, the system can remove up to the entire extended data model 200, such as for the LastName 104 and FirstName 106. In a second approach, the system can zero out or (X out) or otherwise delete the important fields, such as, but not limited to, the data field 212 and/or the decryptionKey 226. In the third approach, all of the data in the extended data model 200 could be kept, but the data is all marked as unusable. For example, the RevokedDT 240 for all use cases could be set to the data and time that the information was to be deleted. Therefore, no queries should be able to access the information.

In some further embodiments, the system can delete the information using method 1 or 2 and leave a note that the data has been deleted, where the note can be shown to auditors. Furthermore, if the system has a positive or affirmative response to the deletion process, that response can be presented to the auditors.

In some embodiments, such as an ecommerce vendor, some of the information may be needed for a period of time, such as address information for billing purposes. In these embodiments, the system can mark the information to be deleted in the next delete cycle. The system could also mark some of the information to be deleted when the billing cycle is complete.

The extended data model 200 can be necessary for tracking the requirements that come from the various privacy-protecting regulations. These requirements can add a significant amount of complexity to the process of data hygiene and data management. This additional complexity can require significant investment of time and resources to update existing databases. Accordingly, FIGS. 3 and 4 describe alternative approaches that can be used as intermediate steps to update existing databased to comply with privacy-protecting regulations.

While the extended data model 200, only shows information relating to the individual's first and last name, the information stored in the extended data model 200 can include any other PII that needs to be protected, this includes, but is not limited to, phone number 110, address 114 (both shown in FIG. 1), email address, SSN, and/or any other piece of PII information. For FIG. 1, each table with PII information could be updated with the extended data model 200.

While the extended data model 200, includes a plurality of tables and fields, ones having skill in the art would understand that the tables and fields of the extended data model 200 could include more or less information to perform as described herein.

It could take years or decades for some systems to mitigate to properly protect PII, such as by using the extended data model 200. In the interim, enterprises are going to have to deal with the regulations and legal requirements around protection of data and tracking how that data gets used or shared. This disclosure demonstrates a proposed methodology as well as provides potential intermediate steps (shown in FIGS. 3 & 4).

Figure 3:
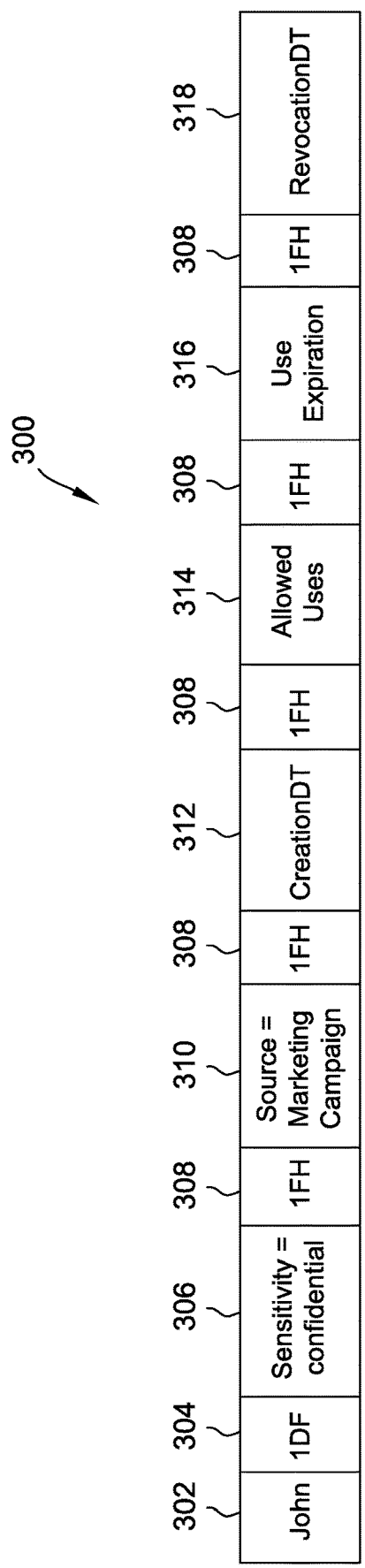
FIG. 3 illustrates a diagram of a first privacy protecting field of the database shown in FIG. 1.

FIG. 3 illustrates a diagram of a first privacy protecting field 300 of the database 100 (shown in FIG. 1). In some situations, a user may only want to update an existing database 100 without completely rewriting it. Or the user may have to update the existing database 100, while creating a version of the extended data model 200 (shown in FIG. 2).

In FIG. 3, a first privacy protecting field 300 is shown, where the first privacy protecting field 300 is associated with the FirstName field 106. The FirstName field 106 is a string. First privacy protecting field 300 divides the string into a plurality of sections. The first section 302 includes the data or information for the field 106. In this case, it is the first name of the individual. This can include any other string field, such as those shown in FIG. 1. Next is the ASCII group separator 304, which is "1DH". When the data for the FirstName field 106 is requested, the system retrieves the entire first privacy protecting field 300, removes the first section and discards anything from the group separator 304 onwards. The second section 306 includes the sensitivity of the data, similar to sensitivity 218 (shown in FIG. 2). The sensitivity section 306 has an enumerated value of who can view the data (to be defined by the implementation team with appropriate values for the application(s), an example set of enumerated values might be {NOT_SENSITIVE, CONFIDENTIAL, SENSITIVE, SECRET, TOP SECRET, EYES_ONLY}). To save space, the enumerated sensitivity section 306 can include a number which is the enumerated value for the sensitivity list. After the second section 306 is the field separator 308 "1FH".

The third section 310 includes the source 220 (shown in FIG. 2), an enumerated value that describes how the data was collected (to be defined by the implementation team with appropriate values for the application(s), an example set of enumerated values might be {MARKETING_CAMPAIGN_NUMBER_721, MARKETING_CAMPAING_NUMBER_44, USER_SUPPLIED, REGISTRATION, PURCHASED, AFFILIATE_NUMBER_551, AFFILIATE_NUMBER_23}).

After the third section 310 is another field separator 308. Then the fourth section 312 includes the CreationDT 224 (shown in FIG. 2) which is a Datetime showing when this field was created or when data behind the first section 302 was collected or created. After the fourth section 312 is another field separator 308.

In some embodiments, a fifth section 314 is for allowed uses, similar to the AllowedUse field 236 (shown in FIG. 2). AllowedUse 236 which is enumeration of allowed uses (to be defined by the implementation team with appropriate values for the application(s), an example set of enumerated values might be {MARKETING_EXPLICIT, MARKETING_IMPLICIT, RECALL, WARRANTY, UPDATES AVAILABLE, SWEEPSTAKES_EXPLICIT, SWEEPSTAKES_IMPLICIT}). After the fifth section 314 is another field separator 308. The sixth field 316 is the UseExpiration 238 (shown in FIG. 2) which is the Datetime for when this particular use of the information (aka first section 302) can no longer be used. After the sixth section 316 is another field separator 308. The seventh field 318 is the RevokedDT 240 (shown in FIG. 2) which is the Datetime for when this particular use was revoked (typically ahead of the previously scheduled UseExpiration 238). For example, an employee may leave a company, which would be used as a revocation for all internal marketing. In another example, an individual may invoke their right to be forgotten effectively revoking them.

In some embodiments, field 300 includes a plurality of sections for Allowed Uses 314, Use Expiration 316, and RevocationDT 318. For example, a single field 300 could have 3 sets of sections 314-318, where each set of fields 314-318 is for one use case.

With some strings only having 55 characters, there are a few issues. First, fitting all of the information in the sections. Accordingly, each section 306-318 should take up a minimum amount of space. For example, each section could be as small as possible, where the enumerated fields each include 1 or two characters based on the number of items on the list. Furthermore, the time/dates for Use Expiration 316 and RevocationDT 318 could be shortened, such as by using 16-bit time or another methodology for shortening the time and date fields.

The other issue is not showing all of the information to someone that has logged in. By having enumerated fields without labels, then an individual would not be able to easily determine what is contained in each section. Furthermore, everything after the group separator 304 is only shown/provided to authorized users. When a query asks for the first name, then only the first section 302 is provided and everything from the group separator 304 on is trimmed.

In some embodiments, the approach shown in FIG. 3 can be used in situations where the extension to the data model 200 is unfeasable or available. This approach can also be used when the user doesn't want to change the database 100 or retest connecting apps.

While, the first privacy protecting field 300, includes a plurality of fields, ones having skill in the art would understand that the fields of the first privacy protecting field 300 could include more, less, or different fields and still allow the system to perform as described herein.

Figure 4:
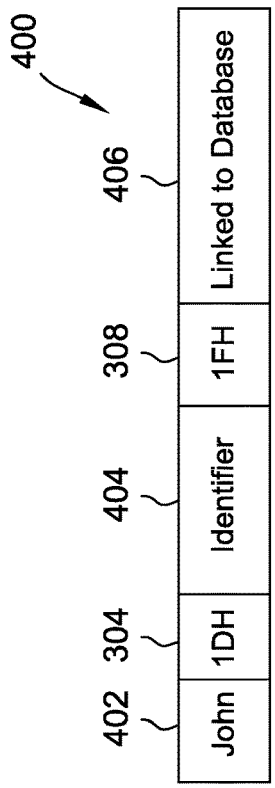
FIG. 4 illustrates a diagram of a second privacy protecting field of the database shown in FIG. 1.

FIG. 4 illustrates a diagram of a second privacy protecting field 400 of the database 100 (shown in FIG. 1). Second privacy protecting field 300 is an alternative to the first privacy protecting field 300. In this embodiment, the extended data model 200 is created for the desired fields, such as LastName 104 and FirstName 106, and connected via the second privacy protecting field 400.

In the exemplary embodiment, the second privacy protecting field 400 includes a first section 402 with the string information, such as the first name or last name. After the first section 402 is a group separator 304. Next is the second section 404 which includes an identifier for the extended data model 200, where the identifier is to be used to identify the entry in the extended data model 200 that applies to the information in the first section 402. After the identifier field 404, is a field separator 308, which is then followed by the third section 406, which includes a link to the extended data model 200. The system uses the link field 406 to access the extended data model 200 and the identifier field 404 to determine while entry to access.

Similar to first privacy protecting field 300, everything after the group separator 304 is only shown/provided to authorized users. When a query asks for the first name, then only the first section 402 is provided and everything from the group separator 304 on is trimmed.

Both first privacy protecting field 300 and second privacy protecting field 400 can include more or less sections with more or less information based on the user's or database administrator's requirements. Furthermore, as a database 100 (shown in FIG. 1) is being modified to include the extended data model 200, the system can use the first privacy protecting field 300 and/or the second privacy protecting field. Furthermore, a database could include the first privacy protecting field 300 for some fields and the second privacy protecting field 400 for other fields.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

At least one of the technical solutions to the technical problems provided by this system may include: (i) improved security concerning personally identifiable information (PII); (ii) ensuring proper need and authorization before providing requested PII; (iii) tracking allowed uses for PII; (iv) tracking deleted information; (v) preventing access to deleted PII; and (vi) improving audit capabilities.

The methods and systems described herein may be implemented using computer programming or engineering techniques including computer software, firmware, hardware, or any combination or subset thereof, wherein the technical effects may be achieved by performing at least one of the following steps: a) store a database including one or more fields of personally identifiable information (PII), wherein the database is a relational database; b) generate a query for the database to request access a first field of the one or more fields of PII, wherein the query includes a use for the requested field of PII; c) query the database to determine if the use for the requested field of PII is valid; d) when the use for the request field of PII is valid, provide access to the requested field of PII data; e) determine if the use has expired; f) determine if the use has been revoked; g) store the field of PII and a plurality of access information in a single string' h) retrieve the string containing the requested field of PII; i) parse the string to retrieve the plurality of access information; j) validate the request based on the plurality of access information and the query; k) trim the string to remove the plurality of access information; l) provide the trimmed string if the request is valid; m) store a plurality of access information for the field of PII is in a separate database, wherein a single string includes the field of PII and a link to the separate database; n) retrieve the string containing the requested field of PII; o) parse the string to retrieve the link to the separate database with the plurality of access information; p) access the separate database to validate the request based on the plurality of access information and the query; q) retrieve the plurality of access information from the separate database based on the identifier; r) store the field of PII in a first table of the database; s) store a first plurality of access information for the field of PII in the first table of the database, wherein first plurality of access information further include information about a source for the field of PII, wherein the first plurality of access information includes at least one document associated with the source for the field of PII; t) store a plurality of allowed uses for the field of PII in a plurality of instances of a second table, wherein each instance of the second table is associated with an allow use of the plurality of allowed uses for the field of PII; u) compare the use from the query with the plurality of allowed uses to determine if the request is valid; v) determine if the allowed use associated with the use from the query has expired or been revoked; w) decrypt the request field of PII when the use for the request field of PII is valid; and x) compare the use from the query with the plurality of allowed uses to determine if the request is valid, wherein the use is valid if there is a match with an allowed use of the plurality of allowed uses and the matching allowed use has not expired or been revoked.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., time variant parameters, consent forms, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the privacy of personally identifying information (PII) of individuals, while also supporting "right to be forgotten" and other removal of data requirements. The present embodiments therefore improve the speed, efficiency, and reliability in which such actions may be performed. Due to these improvements, the aspects described herein address computer-related issues that significantly improve the security of PII in comparison with conventional techniques. Thus, the aspects herein may be seen to also address computer-related issues such as privacy security for electronic computing devices or systems, for example.

Exemplary embodiments of systems and methods for personal information privacy protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A server device for protecting personal information, comprising:

a transceiver configured for operable communication with at least one client over a communication network;

a processor including a memory configured to store computer-executable instructions, which, when executed by the processor, cause the server device to:

store a database including one or more fields of personally identifiable information (PII) including a first field of PII in a first location;

concatenate the first field of PII and a plurality of access information into a single string, which includes at least an encryption key and a Uniform Resource Indicator;

store the concatenated first field of PII and the plurality of access information in a single string in the first location;

generate a query for the database to request access the first field of PII, wherein the query includes a use for the first field of PII;

query the database to determine if the use for the first field of PII is valid;

when the use for the first field of PII is valid, provide access to the first field of PII;

receive a request to delete the one or more fields of PII;

generate a database function to render the one or more fields of PII unreadable;

execute the database function to render the one or more fields of PII unreadable; and replace the one or more fields of PII with a note that the one or more fields of PII have been removed from the database.

2. The server device of claim 1, wherein the database is a relational database.

3. The server device of claim 1, wherein the instructions further cause the server device to determine if the use has been revoked.

4. The server device of claim 1, wherein the instructions further cause the server device to:

retrieve the string containing the first field of PII;

parse the string to retrieve the plurality of access information; and validate the request based on the plurality of access information and the query.

5. The server device of claim 4, wherein the instructions further cause the server device to:

trim the string to remove the plurality of access information; and provide the trimmed string if the request is valid.

6. The server device of claim 1, wherein a plurality of access information for the first field of PII is stored in a separate database.

7. The server device of claim 6, wherein a single string includes the first field of PII and a link to the separate database.

8. The server device of claim 7, wherein the instructions further cause the server device to:

retrieve the string containing the first field of PII;

parse the string to retrieve the link to the separate database with the plurality of access information; and access the separate database to validate the request based on the plurality of access information and the query.

9. The server device of claim 8, wherein the string further includes an identifier, and wherein the instructions further cause the server device to retrieve the plurality of access information from the separate database based on the identifier.

10. The server device of claim 1, wherein the instructions further cause the server device to store the first field of PII in a first table of the database.

11. The server device of claim 10, wherein the instructions further cause the server device to store a first plurality of access information for the first field of PII in the first table of the database.

12. The server device of claim 11, wherein the first plurality of access information further includes information about a source for the first field of PII.

13. The server device of claim 12, wherein the first plurality of access information includes at least one document associated with the source for the first field of PII.

14. The server device of claim 11, wherein the instructions further cause the server device to store a plurality of allowed uses for the first field of PII in a plurality of instances of a second table, wherein each instance of the second table is associated with an allowed use of the plurality of allowed uses for the first field of PII.

15. The server device of claim 14, wherein the instructions further cause the server device to compare the use from the query with the plurality of allowed uses to determine if the request is valid.

16. The server device of claim 15, wherein the instructions further cause the server device to determine if the allowed use associated with the use from the query has expired or been revoked.

17. The server device of claim 10, wherein the first field of PII is encrypted in the database, and wherein the instructions further cause the server device to decrypt the first field of PII when the use for the first field of PII is valid.

18. The server device of claim 1, wherein the instructions further cause the server device to:

compare the use from the query with the plurality of allowed uses to determine if the request is valid, wherein the use is valid if there is a match with an allowed use of the plurality of allowed uses and the matching allowed use has not expired or been revoked.

19. The server device of claim 1, wherein the instructions further cause the server device to:

retrieve an expiration date for the use for the first field of PII; and determine if the use has expired based upon the expiration date.

* * * * *